United States Patent [19]
Rai et al.

[11] Patent Number: 5,271,749
[45] Date of Patent: Dec. 21, 1993

[54] SYNTHESIS OF POLYCRYSTALLINE CUBIC BORON NITRIDE

[75] Inventors: Ghanshyam Rai, Sandy; Xian Yao, Orem, both of Utah

[73] Assignee: Smith International, Inc., Houston, Tex.

[21] Appl. No.: 970,822

[22] Filed: Nov. 3, 1992

[51] Int. Cl.$^5$ .................................. B24D 3/00
[52] U.S. Cl. .................................. 51/293; 51/295; 51/309; 501/87; 501/96
[58] Field of Search ............... 51/293, 295, 309; 501/87, 96

[56] References Cited

U.S. PATENT DOCUMENTS

| | | | |
|---|---|---|---|
| 3,918,219 | 11/1975 | Wentorf, Jr. et al. | 51/307 |
| 3,944,398 | 3/1976 | Bell | 51/307 |
| 4,016,244 | 4/1977 | Susa et al. | 423/290 |
| 4,334,928 | 6/1982 | Hara et al. | 75/238 |
| 4,342,595 | 8/1982 | Bourdeau | 75/238 |
| 4,343,651 | 8/1982 | Yazu et al. | 75/238 |
| 4,389,465 | 6/1983 | Nakai et al. | 428/698 |
| 4,394,170 | 7/1983 | Sawaoka et al. | 75/233 |
| 4,566,905 | 1/1986 | Akashi et al. | 75/244 |
| 4,590,034 | 5/1986 | Hirano et al. | 419/13 |
| 4,596,693 | 6/1986 | Ishizuka et al. | 419/16 |
| 4,619,698 | 10/1986 | Ueda et al. | 75/238 |
| 4,647,546 | 3/1987 | Hall, Jr. et al. | 501/96 |
| 4,650,776 | 3/1987 | Cerceau et al. | 501/96 |
| 4,673,414 | 6/1987 | Lavens et al. | 51/293 |
| 4,690,691 | 9/1987 | Komanduri | 51/309 |
| 4,693,746 | 9/1987 | Nakai et al. | 75/238 |
| 4,837,089 | 6/1989 | Araki et al. | 428/552 |
| 4,883,648 | 11/1989 | Davies et al. | 423/290 |
| 4,911,756 | 3/1990 | Nakai et al. | 75/238 |
| 4,950,557 | 8/1990 | Nakai et al. | 428/698 |
| 5,015,265 | 5/1991 | Corrigan et al. | 51/293 |
| 5,034,053 | 7/1991 | Nakai et al. | 75/238 |
| 5,037,704 | 8/1991 | Nakai et al. | 428/550 |
| 5,043,120 | 8/1991 | Corrigan | 264/67 |
| 5,194,071 | 3/1993 | Corrigan et al. | 51/293 |

*Primary Examiner*—Helene Klemanski
*Assistant Examiner*—Willie J. Thompson
*Attorney, Agent, or Firm*—Christie, Parker & Hale

[57] ABSTRACT

A sintered polycrystalline compact of cubic boron nitride is made by forming a mixture of about 45 to 65 percent by weight cubic boron nitride (cBN), from about 30 to 45 percent by weight hexagonal boron nitride (hBN), and from about 2 to 7 percent by weight an aluminum containing material, preferably aluminum nitride, and cobalt aluminide having a melting temperature lower than the melting temperature of cobalt phase. The mixture of cBN crystals, hBN and adjuvant materials is compacted into preforms and subjected to heat treatment in a non-oxidizing atmosphere. The preforms are placed onto a cemented tungsten carbide substrate containing cobalt and subjected to elevated pressure and temperature conditions at which the boron nitride is thermodynamically stable. The elevated pressure and temperature conditions are maintained for a time sufficient to permit the infiltration of a cobalt phase into the cBN matrix and sinter the compact. Typically, the cobalt phase is infiltrated from a tungsten carbide substrate cemented with cobalt phase. The compact is characterized by substantial intercrystalline cBN to cBN bonding, and has superior abrasive wear resistance, chemical resistance, impact resistance, thermal conductivity and stability. Further, the technique produces a sintered cBN compact that can be machined more efficiently by EDM.

25 Claims, No Drawings

SYNTHESIS OF POLYCRYSTALLINE CUBIC BORON NITRIDE

FIELD OF THE INVENTION

This invention relates to sintered polycrystalline abrasive compacts of cubic boron nitride for use as machining tools, abrasives, wire dies, wear parts, heat sinks and the like. More specifically, it relates to a process for synthesizing polycrystalline cubic boron nitride (cBN) commencing with cubic boron nitride and hexagonal boron nitride which are subjected to very high temperatures and pressures where cBN is thermodynamically stable.

The high pressure form of boron nitride known as cubic boron nitride is surpassed only by diamond in hardness and has a wide variety of uses as machining tools and the like. Polycrystalline cBN is useful, for example, for high speed machining of ferrous metals where reaction of diamond with the iron is a problem. For rough cutting of ferrous metals it is desirable to use a polycrystalline compact of cBN containing no more than the adjuvants required to form the polycrystalline compact. Such a polycrystalline cBN tool has excellent abrasive wear resistance, thermal stability, high thermal conductivity, good impact resistance and low coefficient of friction in contact with a workpiece.

Typically a polycrystalline compact of cBN is made by subjecting cBN crystals to elevated temperature and pressure in combination with sufficient adjuvants for catalyzing the formation of polycrystalline material. It is desirable, however, to dilute the amount of cubic boron nitride crystals used in the process with hexagonal boron nitride (hBN) as the starting material. The cBN crystals must be made in a high pressure, high temperature press and are therefore relatively expensive. Hexagonal boron nitride is the low temperature stable phase of boron nitride and is relatively inexpensive. Thus, a polycrystalline compact made from a mixture of hBN and cBN is less expensive than one made solely from cBN crystals.

The use of adjuvant materials as catalysts or solvents for conversion of hBN to cBN are disclosed in the prior art. U.S. Pat. No. 3,918,219 by Wentorf discloses a method for converting hBN to cBN in the presence of catalysts. Starting from hBN alone, however, does not form a sintered polycrystalline cBN compact containing the necessary physical properties to be useful as a machining tool. Instead, hBN alone forms a weakly bonded polycrystalline cBN structure which breaks apart easily. However, hBN can be used as a suitable starting material, and yield a desirable polycrystalline cBN compact if a limited amount is combined with cBN crystals and suitable adjuvants.

The use of cBN crystals as a starting material for making polycrystalline material is also known in the art. U.S. Pat. No. 4,647,546 by Hall discloses a process for making polycrystalline cBN compact by combining cBN with suitable adjuvants.

Use of both cBN and hBN as starting materials for forming polycrystalline cBN is also known in the art. When both cBN crystals and hBN are used as starting materials the cBN crystals apparently provide nucleation sites for facilitating the formation of polycrystalline cBN during high pressure, high temperature sintering.

Aluminum containing materials have certain desirable properties which have lead to their use in prior art. CBN compositions using aluminum as an aid in bonding cBN under high pressure, high temperature conditions is described in U.S. Pat. No. 3,944,398 by Bell. Bell describes use of a binder material comprising a boride, nitride or silicide refractory substance, and a solvent of aluminum, lead, tin, magnesium, lithium or alloys thereof. The preferred embodiment of Bell employs silicon nitride as a refractory substance and aluminum as a solvent. Bell states that substantially all of the aluminum reacts with the silicon nitride to form aluminum nitride. However, because of the large amount of other materials used, which are considerable softer than cBN, there is a tendency to interfere with intergranular cBN to cBN bonding and adversely affect the abrasion resistance of the sintered cBN compact.

The particular adjuvant materials chosen may also impact the manufacturing or processing of the sintered polycrystalline cBN itself. Once the cBN compact has been sintered, it is often necessary to machine the compact into the desired size and shape of the particular cutting tool to be used. For example, it is known that the use of nickel aluminide as a binder material produces a cBN compact that is easier and thus more efficiently machined by electrical discharge machining (EDM) into the shape of the finished tool than cBN compacts not containing the nickel aluminide. However, there is variability in the processing and such compacts tend to have high electrical resistance and are always not readily cut by EDM.

Another material commonly found in polycrystalline cBN compacts is cobalt. U.S. Pat. No. 4,619,698 by Ueda discloses sintered cBN containing at least one metal selected from the group consisting of cobalt and nickel. The use of cobalt as a solvent and binder material has been shown to improve the degree of sintering of the cBN compact.

A preferred way of forming a cBN compact containing cobalt is to form a layer of the starting material for the cBN on a cemented tungsten carbide substrate which contains cobalt as a binding material. The cobalt binder phase in the cemented tungsten carbide comprises an alloy of cobalt, tungsten and carbon, probably a ternary eutectic melting at about 1320° C. When the composite of a cemented tungsten carbide substrate and cBN crystals, for example, is processed at the high temperatures and pressures of a high pressure press, the cobalt phase in the cemented tungsten carbide melts and infiltrates into the boron nitride layer for facilitating the formation of the intercrystalline bonding required in polycrystalline cBN.

It is desirable to provide a polycrystalline sintered cBN compact employing at least a part of hBN to reduce the cost along with suitable adjuvants to facilitate the intergranular bonding of cBN to produce a compact having a high degree of abrasive wear resistance, impact resistance, high thermal conductivity and the thermal stability required to perform as a cutting tool. It is desirable that the cBN compact be easier to machine into its final form.

BRIEF SUMMARY OF THE INVENTION

There is, therefore, provided in practice of this invention according to a presently preferred embodiment, a process for forming a polycrystalline cubic boron nitride compact at elevated temperature and pressure conditions in presence of a cobalt phase from cubic boron nitride crystals, hexagonal boron nitride, aluminum nitride and cobalt aluminide having a melting point lower than the cobalt phase.

DESCRIPTION

In a preferred embodiment of this invention, cubic boron nitride (cBN) crystals of a particle size suitable for the intended application of a polycrystalline cBN compact are thoroughly blended with a powder of hexagonal boron nitride (hBN) and suitable adjuvant materials. The preferred adjuvant materials include (a) an aluminum containing material selected from the group consisting of aluminum, aluminum nitride, aluminum diboride ($Al_6B_{12}$) and mixtures thereof and (b) cobalt aluminide having a melting point lower than the cobalt phase that is present during the subsequent high pressure, high temperature pressing of the mixture.

To assure enhanced intercrystalline bonding of the cBN, it is preferred that the particle size of the adjuvant materials be approximately equal to that of the cBN crystals. Since finer grain compacts give greater impact resistance, perform suitably for aggressive cutting applications, and give smoother surfaces in finishing applications, a cBN particle size less than about 5 micrometers is preferred. It is preferred that the hBN have a particle size less than about 10 micrometers, that the aluminum containing material have a particle size of less than about 10 micrometers, and that the cobalt aluminide have a particle size less than about 4 micrometers.

The cobalt aluminide material is preferably the intermetallic compound $Co_2Al_9$. Although stoichiometry is not critical, the $Co_2Al_9$ cobalt aluminide is preferred since it has a melting temperature of 943° C., well below the melting temperature of cobalt phase.

Although the reasons that cobalt aluminide is important in forming a high performance polycrystalline cBN compact are not known, it is believed that since this material melts at a relatively lower temperature than other materials in the composition it reacts with or dissolves surfaces on hBN and cBN crystals for facilitating wetting by cobalt which melts at a higher temperature. Substantial wetting action may be as a result of reduction of surface oxides of boron by aluminum in the $Co_2Al_9$. The $Co_2Al_9$ contains about 67.3 weight percent aluminum. The liquid phase contains even more aluminum, about 80 weight percent. There may also be significant solubility in the liquid alloy for boron and nitrogen, thereby enabling reversible dissolution of boron nitride and recrystallization as larger grains of cBN at a lower temperature as compared with utilizing just the infiltrated cobalt phase from the substrate.

Regardless of the mechanism, it has been found that use of cobalt aluminide provides polycrystalline cBN compacts having a higher proportion of cBN, as well as higher cBN to cBN intercrystalline bonding, and a better ability to be machined by electrical discharge machining (EDM) than prior compacts.

Cobalt is apparently important in the formation of polycrystalline cBN and the high temperature, high pressure processing is conducted in the presence of cobalt. In a preferred arrangement, a mixture containing hBN and cBN is placed on a substrate of cemented tungsten carbide containing, for example, about 14% by weight of cobalt as a binder. When this composite is heated in a high pressure press, a portion of the cobalt phase in the cemented tungsten carbide infiltrates into the boron nitride mixture, facilitating conversion of hBN to cBN and assuring good intercrystalline bonding of the cBN crystals. If desired, cobalt powder may be included in the mixture in addition to or in lieu of the cobalt phase infiltrating from a cemented tungsten carbide substrate.

However, when using the cBN compact as a cutting tool, it is enough that the edge of the tool contains a hard and wear resistant layer comprising polycrystalline cBN. Therefore, it is advantageous to form a complex compact which comprises a polycrystalline cBN hard layer and a cemented tungsten carbide substrate integral with the former, in view of the cost and the strength of the tool. The thickness of the hard layer in the composite compact varies according to the operating conditions of the cutting tool as well as the shape thereof, but is generally more than about 0.5 millimeter. Tungsten carbide is desirable since it has a high hardness, heat conductivity and toughness. The thickness of the cemented carbide substrate is generally more than about 2.0 millimeters. Typical embodiments have a cBN layer thickness of about 0.8 mm on a cemented carbide substrate with a thickness of either 2.4 or 4 mm.

Another material employed in the mixture comprises aluminum in the form of aluminum, aluminum nitride or aluminum diboride, and is preferably aluminum nitride. Hexagonal boron nitride may not be stoichiometric BN and is often deficient in nitrogen. Aluminum nitride in the composition provides additional nitrogen to enhance the nitrogen content of the hBN and bring it closer to stoichiometry. Aluminum nitride may also assist in this reaction by forming aluminum diboride, thereby decreasing the amount of boron in the hexagonal boron nitride and also bringing it closer to stoichiometry. Preferably, the aluminum nitride is present in sufficiently small grains that it substantially completely dissolves in the cobalt phase during sintering. A small amount of residual aluminum nitride or aluminum diboride remaining in the completed polycrystalline compact, is no substantial detriment since these are relatively hard materials. Aluminum not in the form of such compounds would be in solution in the cobalt phase.

It is desirable that the amount of cobalt phase infiltrating into the polycrystalline cBN compact be up to about 25% by weight. When the proportion of cobalt phase in the compact is more than about 25% this relatively softer phase tends to decrease the hardness and wear resistance of the compact. For reasons that are not clear, the use of $Co_2Al_9$ as a starting material can produce a compact with about 25% cobalt phase. Cobalt aluminide is preferred as compared with nickel aluminide since the composition includes other sources of cobalt and has no other sources of nickel. Furthermore, cobalt aluminide has a melting temperature about 90° C. higher than nickel aluminide. This permits a higher temperature to be used during heat treatment of the mixture.

Before combining the cBN crystals with the hBN and adjuvant materials, the cBN crystals are first heat treated in a non-oxidizing and preferably reducing atmosphere at a temperature of about 1000° C. for a duration of about one to two hours. The non-oxidizing atmosphere may be $10^{-4}$ to $10^{-6}$ Torr vacuum, hydrogen or ammonia. The purpose of the initial heat treatment is remove any adsorbed water vapor, oxides or other volatile impurities that may interfere with intercrystalline bonding of the cBN. Heat treating in ammonia is desirable since that may avoid loss of nitrogen and non-stoichiometry in the boron nitride.

The cBN crystals are then combined with the powders of hBN and adjuvants in preferred weight ratios and thoroughly blended together with tungsten carbide balls and alcohol in a nitrogen charged ball mill. The mixture is compacted into preforms and heat treated in a non-oxidizing atmosphere at a temperature in the range of about 600° to 950° C. for about four hours for reducing oxides. The non-oxidizing atmosphere may either be $10^{-4}$ to $10^{-6}$ Torr vacuum, hydrogen or ammonia. A typical heat treatment comprises heating in vacuum at about 950° C. for four hours.

A preform heat treatment temperature of more than about 600° C. is used to volatilize boron oxide ($B_2O_3$) from hBN. The volatilization of ($B_2O_3$) facilitates hBN to cBN conversion by removing oxides that would otherwise interfere with intercrystalline bonding. A heat treatment temperature of up to about 950° C. is preferred since the cobalt aluminide tends to melt at temperatures above 950° C.

Each preform is then placed onto a cemented tungsten carbide/cobalt substrate and the preform and substrate are loaded into a closed container. Careful selection of container materials minimizes infiltration of undesirable materials into the compact and protects it from oxidation or the like. Molybdenum, nickel, titanium, tungsten, zirconium, and stainless steel have been found to be suitable. A preferred container material is niobium.

A closed niobium container enclosing the substrate and preform to be sintered is surrounded by a pressure transmitting medium such as salt, talc or the like. The container and pressure transmitting medium are placed in a graphite or metallic heater surrounded by a pressure transmitting and gasket forming material such as pyrophyllite and placed into the chamber of a suitable high pressure, high temperature apparatus.

After pressure in excess of about 20 kilobars is applied to bring the mixture into the region of cBN thermodynamic stability, electrical resistance heating is applied to melt some of the materials, convert the hBN to cBN, and sinter the compact to maximum density. An exemplary cycle comprises a pressure of about 50 kbar at temperatures in excess of 1200° C. for about 15 minutes. The sintering temperature should be higher than the melting temperature (about 1320° C.) of the cobalt-tungsten-carbon eutectic phase in the cemented tungsten carbide. After sintering is complete the heating current is decreased and the sample is cooled below about 200° C., after which the applied pressure is removed and the container taken from the high pressure press.

It is believed that the mechanism that occurs during the sintering proceeds as follows: When the temperature exceeds 950° C. by a sufficient margin, the cobalt aluminide melts with consequent reaction and/or dissolution of boron nitride materials and possibly a portion of the aluminum nitride. When the temperature of the cobalt phase in the cemented tungsten carbide is exceeded, the cobalt phase melts and infiltrates into the composite material, probably assuring dissolution of any remaining aluminum nitride and cobalt aluminide.

As a result of the high temperature, high pressure conditions, the hexagonal boron nitride is converted to cubic boron nitride and crystals of cubic boron nitride grow and coalesce into a polycrystalline compact. Cooling of the compact may result in additional precipitation of cubic boron nitride for enhanced intercrystalline bonding. It has not been determined whether any aluminum nitride or cobalt aluminide remains as a separate phase in the polycrystalline compact, however, that seems unlikely.

For reasons that are not clear, using cobalt aluminide as an adjuvant increases the electrical conductivity of the cBN compact. For example, the electrical resistance across a 19 millimeter wide disk of polycrystalline cBN on a tungsten carbide substrate shows a resistance of about 0.8 ohm when the compact is made with use of cobalt aluminide as an adjuvant. This is to be contrasted with a polycrystalline cBN compact made when nickel aluminum alloy was used as an adjuvant. There the electrical resistance of a similar sample is typically in the order of 2.2 to 2.3 ohms.

Increased electrical conductivity is desirable because it facilitates the machining of the compact into a desired shape of cutting tool. After a sintered compact is removed from the high pressure, high temperature chamber, electrical discharge machining is used to cut the sintered compacts into their desired shape. In the past it has been necessary to EDM one compact at a time. The increased electrical conductivity of a compact from using cobalt aluminide as an adjuvant permits machining from four to six compacts simultaneously, which as will be apparent, significantly decreases the cost.

The reason for the increased electrical conductivity is not understood. In a typical cBN compact where cobalt aluminide is used as an adjuvant, the cobalt phase in the compact is about 25% by weight. Without cobalt aluminide as an adjuvant, the cobalt phase may be as high as 32 or 33% by weight. Regardless of this higher metal content in the polycrystalline compact, the electrical resistance is also higher. Furthermore, the presence of the increased amount of metallic phase lowers the wear resistance of the cBN compact. A metal content of 25% by weight is about 7% by volume. It is generally desirable to keep the volume percentage of softer metal phase at a minimum to enhance the wear resistance.

It is preferred that the ratio of cBN to hBN in the mixture from which a polycrystalline cBN compact is made is about 2:1. When the cBN to hBN ratio is greater than about 2:1 the proportion of hard cBN relative to softer hBN makes a mixture that is difficult to compress into a solid preform. On the other hand when the cBN to hBN ratio is less than about 2:1 the larger proportion of hBN may not be quantitatively converted to cBN or the cBN intercrystalline bonding may be reduced so that the wear resistance of the compact is reduced. Furthermore, decreasing the ratio may lead to higher metal phase content which can reduce wear resistance. Thus, for example, when the ratio of cBN to hBN is about 2:1 the cobalt phase is about 25 percent by weight, and when the ratio is about 60:40, the cobalt phase increases to about 32%.

In an embodiment where the mixture is not pressed into a preform, the ratio of cBN to hBN may range up to about 2.5:1. Generally, however, it is desired to have the higher proportions of hBN since it is a less costly material than cBN.

Preferably, the proportion of cBN in the mixture is in the range from about 45 to 65% by weight. The preferred amount of hBN in the total mixture is in the range from about 30 to 45% by weight. Such variation from the preferred ratio of cBN to hBN may be tolerable for producing polycrystalline cBN compacts having acceptable properties.

The preferred amount of adjuvant materials present in the total mixture of cBN, hBN and adjuvants is in the range of from about 2 to 10% by weight. Preferably the aluminum nitride is present in the range of from about 2 to 7% by weight of the total mixture. The range of aluminum nitride used in the mixture is to some extent dependent on the amount of hBN present. Since the aluminum nitride supplies nitrogen and binds boron, a larger variation from stoichiometry in the hBN or a larger amount of hBN may require higher proportions of aluminum nitride. If the mixture comprises less than about 2% by weight of aluminum nitride, there may not be sufficient nitrogen to facilitate the hBN to cBN conversion. On the other hand, in a mixture containing more than about 7% by weight aluminum nitride, the abrasive wear resistance of the completed compact may be reduced, making the compact less desirable as a cutting tool.

Preferably the cobalt aluminide ($Co_2Al_9$) comprises from about 1 to 3% by weight of the total mixture. A mixture having less than about 1% $Co_2Al_9$ seems to have less facilitating of early hBN solution and cleaning of surfaces for crystal growth. A reduced electrical conductivity and less cBN to cBN intercrystalline bonding may be consequences. Preferably the amount of cobalt aluminide is up to about 3% by weight for minimizing the presence of softer phase in the cBN compact, and since larger amounts are not required to achieve excellent infiltration of the cobalt phase and low metal content in the compact.

The resulting polycrystalline cBN compact possesses advantageous qualities not found simultaneously in the prior art; namely, (1) high cBN concentration with strong intercrystalline cBN to cBN bonding resulting from high hBN to cBN conversion, (2) high resistance to erosion by abrasive materials, (3) high thermal conductivity, (4) high wear resistance under aggressive conditions in cutting of ferrous alloys, (5) high thermal stability, (6) low coefficient of friction versus ferrous metals, (7) lack of chemical or metallurgical reaction with the workpiece, and (8) good impact resistance.

This method of making the polycrystalline cBN compact is also economically advantageous because the use of hBN as a starting material reduces the amount of higher priced cBN crystals needed as the starting material, and the method produces a sintered cBN compact that can be more efficiently machined into its final form.

One of the difficulties of prior art techniques has been obtaining adequate yield of usable products. Thus, when the compacts are made, cracking or chips may make a compact unusable. Such defects may not be discovered until the compacts are machined to their final form. It is found that by using $Co_2Al_9$ as an adjuvant in the process of forming polycrystalline cBN, the yield increases dramatically. The yield of good compacts coming out of the high pressure press increased to over 95% and the yield of finish machined parts increased to about 90%, a major contribution to decreased cost per compact.

The following examples demonstrate the practice of preferred embodiments of the invention.

EXAMPLE 1 cBN crystals, having an average particle size of less than about 5 micrometers, were heat treated in an ammonia atmosphere at 1000° C. for 1½ hours. The cBN crystals were intimately mixed with hBN powder having an average particle size of about 15 micrometers, aluminum nitride (AlN) powder having an average particle size less than about 8 micrometers, and cobalt aluminide ($Co_2Al_9$) powder having an average particle size of less than about 4 micrometers.

The cBN crystals, hBN powder and adjuvant materials were combined in the weight ratio of 61% cBN, 33% hBN, 5% AlN and 1% $Co_2Al_9$, and thoroughly mixed with tungsten carbide balls and alcohol in a nitrogen charged mill. The mixture was compacted into preforms having the approximate shape of the sintered cBN compact tool. The preforms were subjected to a preform heat treatment at about $10^{-4}$ to $10^{-6}$ Torr vacuum and about 950° C. for about 4 hours. Each preform was then placed onto a cemented tungsten-carbide/cobalt substrate and both were loaded into a closed niobium container.

The closed container was surrounded with a NaCl pressure-transmitting medium, loaded into a pyrophyllite cell and subjected to high pressure at about 75 kbar and high temperature at about 1400° C. to 1500° C. After maintaining the temperature for approximately 15 minutes, the load was allowed to cool and then the pressure was reduced. A micro structural analysis on the polished surface revealed a complete conversion of hBN to cBN and excellent cBN to cBN intergranular bonding of crystals of very uniform size. This feature is important in getting good wear properties. Micro hardness of the polycrystalline cBN layer was measured to be 3000 Kg/mm$^2$ using the Vickers test method.

EXAMPLE 2

Two differently sized cBN crystals, having an average particle size of less than about 2 micrometers and less than about 5 micrometers, were heat treated in an ammonia atmosphere at 1000° C. for 1½ hours. The cBN crystals were intimately mixed with hBN powder having an average particle size of about 15 micrometers, aluminum nitride (AlN) powder having an average particle size less than about 8 micrometers, and cobalt aluminide ($Co_2Al_9$) powder having an average particle size of less than about 4 micrometers.

The cBN crystals, hBN powder and adjuvant materials were combined in the weight ratio of 52 percent by weight less than 5 micrometer cBN particles, 9 percent by weight less than 2 micrometer cBN particles, 33 percent by weight hBN, 5 percent by weight AlN, and 1 percent by weight $Co_2Al_9$ and thoroughly mixed with tungsten carbide balls and alcohol in a nitrogen charged mill. The mixture was compacted into preforms, heat treated and subjected to sintering temperature and pressure conditions in the same manner as described in Example 1.

A micro structural analysis on the polished surface revealed a complete conversion of hBN to cBN and excellent cBN to cBN intergranular bonding of crystals of very uniform size. Micro hardness on the polycrystalline cBN layer was measured to be 3000 Kg/mm$^2$ using the Vickers test method.

EXAMPLE 3 cBN crystals, having an average particle size range of two to four micrometers, were heat treated in an ammonia atmosphere at 1000° C. for 1½ hours. The cBN crystals were intimately mixed with hBN powder having an average particle size of less than ten micrometers, aluminum nitride (AlN) powder having an average particle size less than ten micrometers, and cobalt aluminide ($Co_2Al_9$) powder having an average particle size of less than ten micrometers.

The cBN crystals, hBN powder and adjuvant materials were combined in the weight ratio of 61% cBN, 35% hBN, 2% AlN and 2% $Co_2Al_9$, and thoroughly mixed with tungsten carbide balls and alcohol in a nitrogen charged mill. The mixture was compacted into preforms, heat treated and subjected to sintering temperature and pressure conditions in the same manner as described in Example 1.

A micro structural analysis on the polished surface revealed complete conversion of hBN to cBN and excellent cBN to cBN intergranular bonding of crystals of very uniform size. Micro hardness on the polycrystalline cBN layer was measured to be 3000 $Kg/mm^2$ using the Vickers test method.

It is possible within the scope of this invention to practice a wide variety of compositions and temperature-pressure conditions in cycles which will achieve the same objective as these examples, and the foregoing examples are designed to be illustrative rather than limiting.

The description has specified $Co_2Al_9$ as the preferred composition for an adjuvant for the formation of cBN, however, other Co-Al alloys may be equivalent. For example, there is another cobalt-aluminum intermetallic compound, $Co_2Al_5$, which has a melting point of 1170° C. and about 53 weight percent aluminum which may also be used for melting at a somewhat higher temperature. There is postulated to be another intermetallic compound, $Co_4Al_{13}$, thought to have a melting point of about 1120° C. which may also be used. Non-stoichiometric alloys may also be used.

Use of such a composition may permit preliminary heat treatment or reduction of preforms at about 1000° C. At higher temperatures some of the cBN may convert to hBN. Higher temperature heat treatment of the preforms enhances rate of reaction and volatilization of $B_2O_3$ and the rate of diffusion of oxygen through the crystal lattice. Of course, compositions which are non-stoichiometric may also be used. Their melt characteristics and compositions will be apparent from the aluminum-cobalt phase diagram.

While cubic boron nitride is the preferable high pressure boron nitride, it is to be understood within the scope of the invention that a cBN compact may also be made by using wurzitic boron nitride or a mixture of cubic and wurzitic boron nitride as a starting material.

Magnesium nitride or lithium nitride may be used instead of aluminum nitride as a source of nitrogen for adjusting the stoichiometry of hBN. They do not appear to be as beneficial as the aluminum nitride for use in a machining tool.

Although a polycrystalline cBN compact with only the second cobalt phase is preferred, other hard materials may be included in the composition, if desired. For example, a polycrystalline cBN compact is quite suitable for high speed, rough machining operations. For finishing operations on ferrous materials, it may be desirable to have a compact having a portion of polycrystalline cubic boron nitride and a portion of titanium carbonitride. In such an embodiment the proportion of Ti(CN) may comprise up to about 40% by weight of the total mixture. The Ti(CN) imparts chemical and thermal resistance to the cBN compact and although it tends to reduce the abrasive wear resistance of the compact in some applications, it may make a desirable cutting tool. When Ti(CN) is used in the composition, the ratio of cBN to hBN may be somewhat lower than for a composition which produces a compact having only polycrystalline cBN.

Other hard materials may be included such as a carbide, nitride or carbonitride containing material of a group IVb, Vb or VIb transition metal. For example, a small amount of tungsten carbide in addition to, or in lieu of titanium carbonitride may be included in the composition.

Because of variations such as these, it is to be understood that the invention may be practiced otherwise than as specifically described.

What is claimed is:

1. A method for forming a sintered polycrystalline cubic boron nitride compact comprising the steps of:
   mixing cubic boron nitride crystals, hexagonal boron nitride, cobalt aluminide having a melting point lower than the melting temperature of cobalt, and an aluminum bearing material selected from the group consisting of aluminum nitride, aluminum and aluminum diboride, the mixture comprising at least 30 percent by weight hexagonal boron nitride to facilitate compressing the mixture into a solid preform; and
   subjecting the mixture in the presence of a cobalt phase to elevated temperature and pressure conditions where cubic boron nitride is thermodynamically stable.

2. A method as recited in claim 1 wherein the ratio of cubic boron nitride to hexagonal boron nitride is about 2:1.

3. A method as recited in claim 1 wherein the mixture contains in the range of from 45 to 65 percent by weight cubic boron nitride.

4. A method as recited in claim 1 wherein the mixture contains in the range of from 30 to 45 percent by weight hexagonal boron nitride.

5. A method as recited in claim 1 wherein the mixture contains in the range of from 1 to 7 percent by weight aluminum nitride.

6. A method as recited in claim 1 wherein the mixture contains in the range of from 1 to 3 percent by weight cobalt aluminide.

7. A method as recited in claim 1 comprising the steps of compressing the mixture into a preform, and placing the preform on a substrate of tungsten carbide cemented with cobalt.

8. A method as recited in claim 1 comprising the initial step of subjecting the mixture to elevated temperature to an environment of hydrogen, ammonia or vacuum at a temperature in the range of from 600° to 950° C.

9. A method as recited in claim 1 comprising adding to the mixture a material selected from a group comprising carbide, nitride, or carbonitride of a group IVb, Vb and VIb transition metal from the periodic table.

10. A method as recited in claim 9 comprising adding titanium carbonitride up to about 40 percent by weight of the mixture.

11. A method as recited in claim 1 comprising the step of placing the mixture on a substrate of tungsten carbide cemented with cobalt for infiltrating cobalt phase into the mixture during the step of subjecting the mixture to elevated temperature and pressure.

12. A method as recited in claim 1 wherein the cobalt aluminide comprises $Co_2Al_9$.

13. A sintered polycrystalline compact made by a method as recited in any one of claims 1, 2, 3, 4, 5, 6, 7, 8, 10, 11 or 12.

14. A method for preparing a sintered polycrystalline compact with substantial intercrystalline bonding of high pressure boron nitride which comprises the steps of:
- forming a mixture comprising high pressure boron nitride with an amount of low pressure boron nitride, an aluminum containing adjuvant material, and cobalt aluminide having a melting temperature lower than the melting temperature of cobalt phase;
- subjecting the mixture to elevated temperature in a non-oxidizing environment sufficient to remove boron oxide;
- placing the mixture onto a substrate comprising tungsten carbide cemented with cobalt;
- subjecting the mixture to elevated temperature and pressure conditions sufficient to melt cobalt phase in the substrate, and at which conditions high pressure boron is thermodynamically stable; and
- maintaining the elevated conditions for a time sufficient to allow for substantial intercrystalline bonding of cubic boron nitride to thereby sinter the compact.

15. A method as recited in claim 14 wherein the mixture contains in the range of from 1 to 3 percent by weight cobalt aluminide.

16. A method as recited in claim 15 wherein the mixture contains in the range of from 45 to 65 percent by weight cubic boron nitride.

17. A method as recited in claim 16 wherein the mixture contains in the range of from 30 to 45 percent by weight hexagonal boron nitride.

18. A method as recited in claim 17 wherein the mixture contains in the range of from 1 to 7 percent by weight aluminum nitride.

19. A method as recited in claim 15 wherein the ratio of cubic boron nitride to hexagonal boron nitride is about 2:1.

20. A method as recited in claim 14 comprising adding to the mixture a material selected from a group comprising carbide, nitride, or carbonitride of a group IVb, Vb and VIb transition metals from the periodic table.

21. A method as recited in claim 19 comprising adding to the mixture titanium carbonitride up to about 40 percent by weight of the mixture.

22. A method as recited in claim 14 wherein the initial elevated temperature treatment is conducted in a vacuum, ammonia, or hydrogen atmosphere at a temperature in the range of from 600° to 950° C.

23. A method as recited in claim 14 wherein the cobalt aluminide comprises $Co_2Al_9$.

24. A method for preparing a sintered polycrystalline compact of cubic boron nitride comprising the steps of:
- combining cubic boron nitride crystals with hexagonal boron nitride, aluminum nitride and cobalt aluminide having a lower melting point than cobalt phase, the cubic boron nitride comprising in the range of from 45 to 65 percent by weight of the mixture, the hexagonal boron nitride comprising in the range of from 30 to 45 percent by weight of the mixture, the aluminum nitride comprising in the range of from 1 to 7 percent of the mixture, and the cobalt aluminide comprising in the range of from 1 to 3 percent by weight of the mixture;
- compacting the mixture onto a preform;
- subjecting the preform to a heat treatment in a vacuum, ammonia, or hydrogen atmosphere at a temperature of at least 600° C.;
- placing the preform onto a tungsten carbide substrate cemented with cobalt;
- loading the substrate and mixture into a closed chamber;
- subjecting the mixture and substrate to elevated temperature and elevated pressure conditions sufficient to melt cobalt phase in the substrate, at which conditions the cubic boron nitride is thermodynamically stable, whereby cobalt phase infiltrates the mixture causing intercrystalline bonding; and
- maintaining the elevated temperature and pressure conditions for a time sufficient to allow for substantial intercrystalline bonding to thereby sinter the compact.

25. A method as recited in claim 24 comprising adding to the mixture titanium carbonitride in an amount up to about 40 percent by weight of the total mixture.

* * * * *